(12) United States Patent
de Sousa et al.

(10) Patent No.: US 10,513,327 B2
(45) Date of Patent: Dec. 24, 2019

(54) VARIABLE ANGULAR COMPRESSION SEAL ASSEMBLIES FOR MOVEABLE AIRCRAFT COMPONENTS

(71) Applicant: EMBRAER S.A., São José dos Campos—SP (BR)

(72) Inventors: Guilherme Luiz Caselato de Sousa, São José dos Campos (BR); Kelbert Cleiber de Lima, São José dos Campos (BR); Wanderley Montoro, Caçapava (BR)

(73) Assignee: EMBRAER S.A., São José dos Campos—SP (BR)

(*) Notice: Subject to any disclaimer, the term of this patent is extended or adjusted under 35 U.S.C. 154(b) by 287 days.

(21) Appl. No.: 15/596,340

(22) Filed: May 16, 2017

(65) Prior Publication Data

US 2017/0327204 A1    Nov. 16, 2017

Related U.S. Application Data

(60) Provisional application No. 62/336,890, filed on May 16, 2016.

(51) Int. Cl.
| | |
|---|---|
| *B64C 9/02* | (2006.01) |
| *F16J 15/16* | (2006.01) |
| *B64C 7/00* | (2006.01) |
| *F16J 15/10* | (2006.01) |

(52) U.S. Cl.
CPC ............. *B64C 9/02* (2013.01); *B64C 7/00* (2013.01); *F16J 15/104* (2013.01); *F16J 15/16* (2013.01)

(58) Field of Classification Search
CPC ........ B64C 9/02; B64C 1/26; B64C 7/00; F16J 15/16; F16J 15/104
USPC ......................................................... 244/215
See application file for complete search history.

(56) References Cited

U.S. PATENT DOCUMENTS

| | | | | |
|---|---|---|---|---|
| 2,394,732 | A * | 2/1946 | Williams | A44B 11/26 24/385 |
| 3,732,788 | A * | 5/1973 | Brown | E01C 11/106 404/64 |
| 3,892,016 | A * | 7/1975 | Brown | A44B 19/32 24/386 |
| 4,027,361 | A * | 6/1977 | Yoneya | A44B 19/26 116/DIG. 20 |
| 4,979,702 | A * | 12/1990 | Franklin | A44B 19/26 24/385 |

(Continued)

*Primary Examiner* — Claude J Brown
(74) *Attorney, Agent, or Firm* — Nixon & Vanderhye P.C.

(57) ABSTRACT

Variable angular compression seal assemblies are disclosed that may usefully be employed to seal movable aircraft components, e.g., so as to seal a flap torque tube operating in a flap track cutout opening in a wing to fuselage fairing. The seal assembly may be provided so as to seal a component moveable between first and second positions within a cutout opening. The seal assembly includes a split seal having opposed seal members in non-compressive contact with one another along a split line between opposed ends of the seal members so as to allow the component to be moved along the split line between the first and second positions thereof. The seal members include opposed wall portions at one end thereof defining a recess for receiving the moveable component when in the first position thereof. The split line between the opposed seal members can be variably curved.

10 Claims, 5 Drawing Sheets

(56) References Cited

U.S. PATENT DOCUMENTS 6,039,503 A * 3/2000 Cathey .................... E01C 11/10
            14/73.1
9,663,276 B2 * 5/2017 Harvey .................. B65D 53/02

* cited by examiner

VARIABLE ANGULAR COMPRESSION SEAL ASSEMBLIES FOR MOVEABLE AIRCRAFT COMPONENTS

CROSS-REFERENCE TO RELATED APPLICATION

This application is based on and claims priority benefits of U.S. Provisional Application Ser. No. 62/336,890 filed on May 16, 2016, the entire content of which is expressly incorporated herein by reference.

FIELD

The embodiments disclosed herein relate generally to variable angular compression seal assemblies that may usefully be employed to seal movable aircraft components, e.g., so as to seal flap track openings in a wing to fuselage fairing.

BACKGROUND

There are a number of concepts that are widely used in the aeronautical industry so as to sealably close a cutout opening in an aircraft structure so as to accommodate moveable aircraft components, for example a cutout opening in a wing fuselage fairing which allows the passage and movement of a flap torque tube to operate wing-mounted aerodynamic flaps. In this regard, it has been proposed in the past to provide an external fairing having a circumferential rubber based seal so as to physically cover the fuselage cut-out opening. The provision of an external fairing however leads to a considerable drag penalty for the aircraft due to the increased frontal and wetted airflow areas. Moreover, actuation of the flaps will in turn expose the cut-out opening thereby generating cavity noise.

Internal vertical seals have also been proposed whereby two seals are positioned normal to the flap torque tube such that upper and lower parts of the seal cover all of the cut-out opening. In order for such vertical seals to be install so as to work properly, it is necessary for the shape of the fairing to be fully planar and oriented normal to the flap torque tube. Such a condition results in a vertical compression of the seal which, as a consequence of this shape and compression, the lateral regions of the seals must be opened. The full cut-out covering situation thereby leads to a seal being always compressed in a certain part along its length, which reduces seal lifespan.

What has been needed in the art, therefore are variable angular compression seal assemblies which address the problems of the known proposals discussed above thereby extending the serviceable lifespan of the seal and improving seal performance. It is towards providing such improvements that the embodiments disclosed herein are directed.

SUMMARY

In general, embodiments disclosed herein relate generally to variable angular compression seal assemblies that may usefully be employed to seal movable aircraft components, e.g., so as to seal flap track openings in a wing to fuselage fairing. According to some embodiments, a seal assembly is provided to seal a component moveable between first and second positions within a cutout opening, the seal assembly comprising a split seal having opposed seal members in non-compressive contact with one another along a split line between opposed ends of the seal members so as to allow the component to be moved along the split line between the first and second positions thereof, wherein the seal members include opposed wall portions at one end thereof defining a recess for receiving the moveable component when in the first position thereof. The split line between the opposed seal members can be variably curved.

Each of the seal members may be an integral elastomeric structure having a hollow rectangular cross-sectional configuration. In such embodiments, the seal members will include opposed upper and lower walls integrally joined to opposed interior and exterior walls, and opposed end wall. A series of internal walls may extend integrally between the opposed interior and exterior walls.

According to preferred embodiments, an aircraft is provided with a fairing having cutout opening and a torque tube moveably operable within the cutout opening between forward and aft positions so as to move wing flaps of the aircraft between retracted and deployed positions. A seal assembly is therefore provided to sealably close the cutout opening of the fairing. The seal assembly will preferably comprise a split seal having opposed seal members in non-compressive contact with one another along a split line between opposed ends of the seal members so as to allow the torque tube to be moved along the split line between the forward and aft positions thereof. The seal members may include opposed wall portions at one end thereof defining a recess for receiving the torque tube when in the forward position thereof.

A guide support structure may be provided having opposed forward and aft tapered U-shaped guide surfaces configured to receive therein respective lower and upper portions of the upper and lower seal members.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
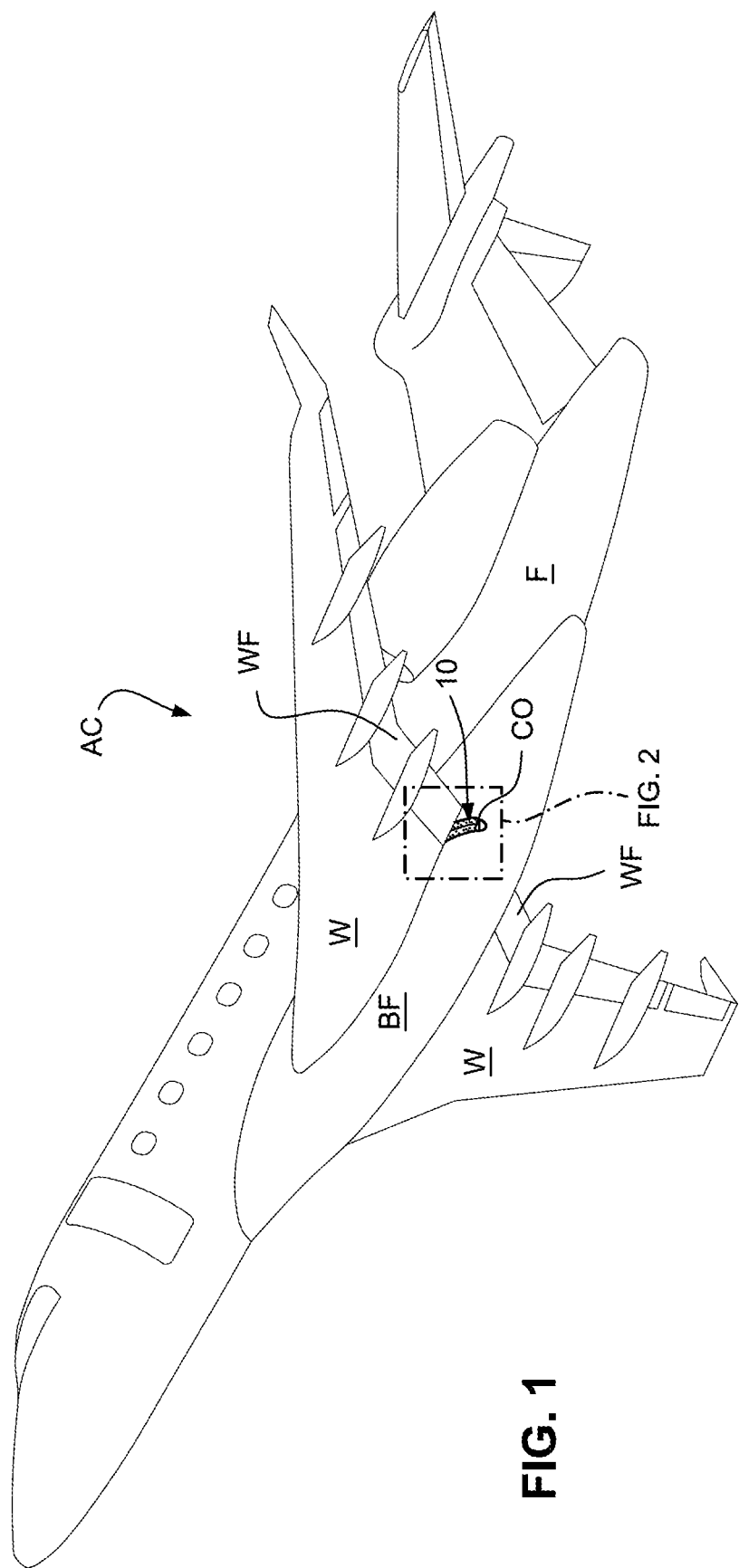
FIG. 1 is rear portside perspective view of an aircraft equipped with a flap track cutout opening in the belly fairing which is provided with a variable angular seal assembly for the flap torque tube operating within the cutout opening between retracted and extended positions thereof.
Figure 2:
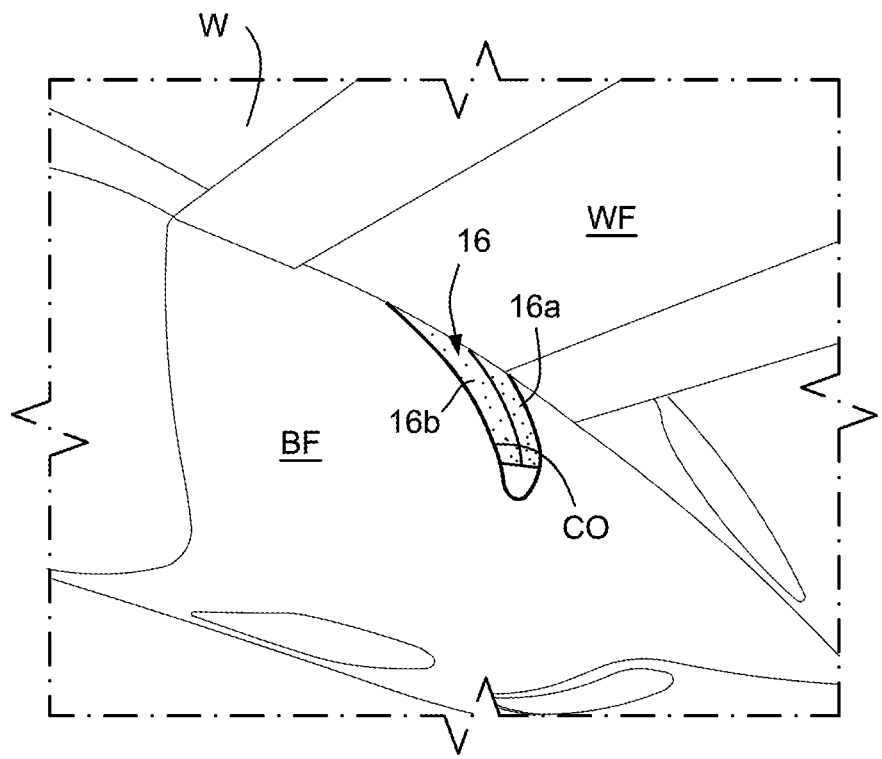
FIG. 2 is an enlarged external view of the belly fairing and flap tack cutout opening in the aircraft depicted in FIG. 1.
Figure 3:
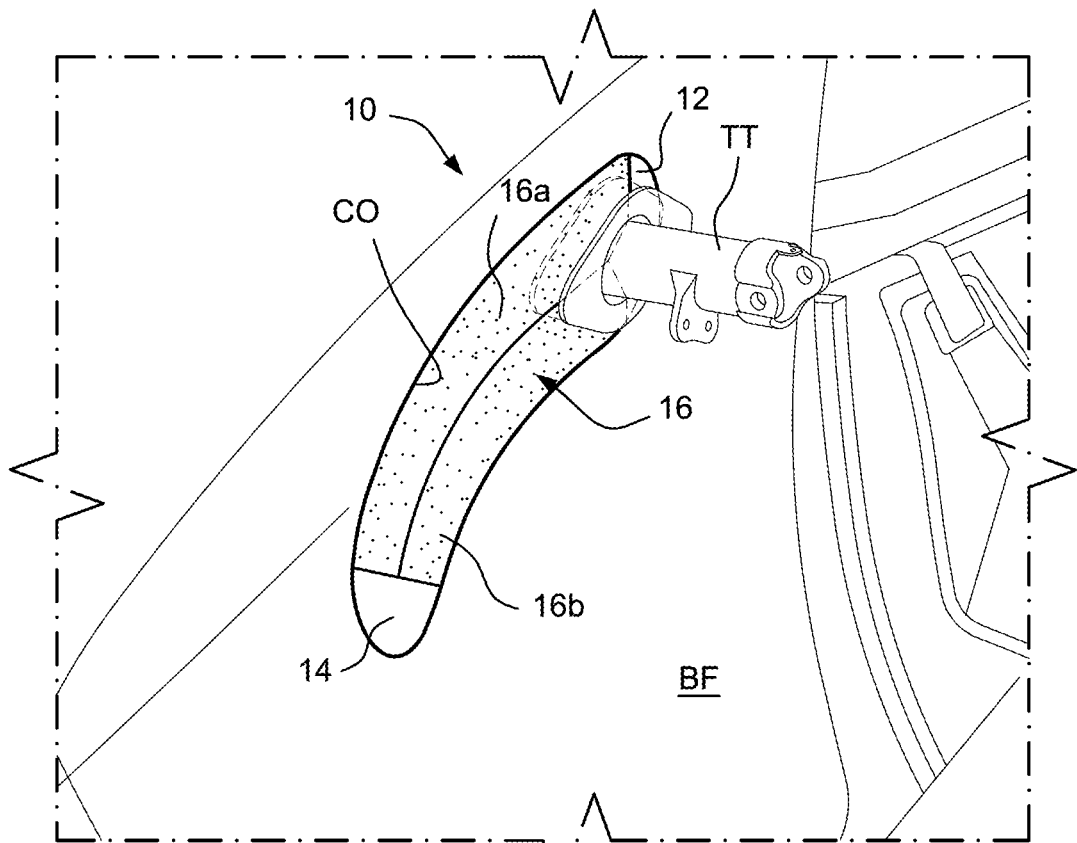
FIG. 3 is an enlarged internal view of the belly fairing and flap tack cutout opening in the aircraft depicted in FIG. 2.
Figure 4:
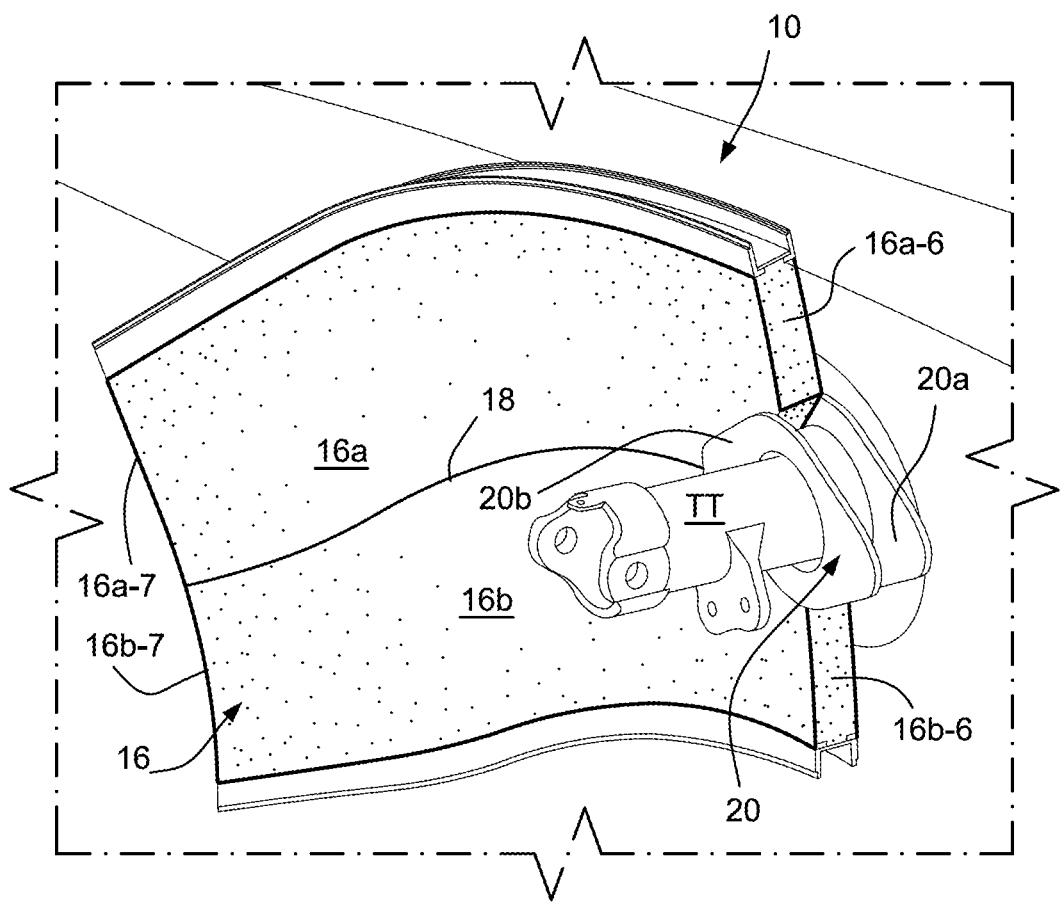
FIGS. 4 and 5 are enlarged external and internal views, respectively, of the variable angular seal assembly employed in the flap track cutout opening of the belly fairing.
Figure 5:
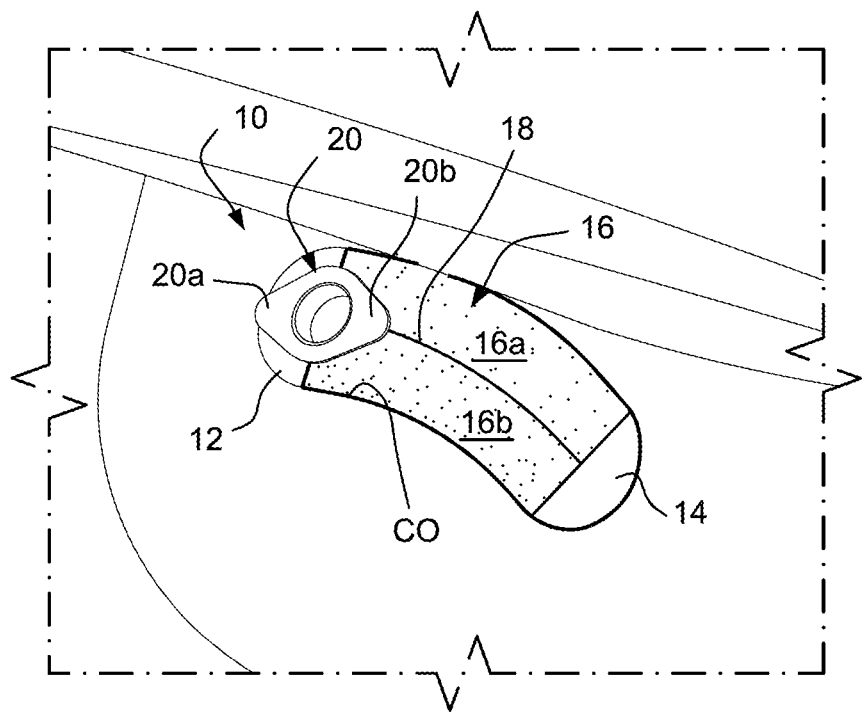

As is shown in FIG. 1, an aircraft AC may be provided with a belly fairing BF along a portion of the fuselage F in the vicinity of the aircraft wings W. As is perhaps more clearly shown in FIGS. 2 and 3, the belly fairing BF is provided with a flap track cutout opening CO through which a flap torque tube TT extends so as to operably connect the movable flaps WF on the aircraft wings to on-board motors. The torque tube thus moves between forward and aft positions within the cutout opening CO so as to in turn move the wing flaps WF between retracted and deployed conditions as may be needed for operation of the aircraft AC. A variable angular seal assembly 10 in accordance with an embodiment of the invention is provided so as to close the cutout opening CO and sealably contact the torque tube TT during its movement between the forward and aft positions thereof.

The seal assembly 10 is shown in greater detail in accompanying FIGS. 4-7 as comprising a forward and aft stationary seal members 12, 14 positioned at the forward and aft ends of the cutout opening CO and an intermediate split seal 16 therebetween. The split seal 16 is comprised of a set of opposed upper and lower seal members 16a, 16b, respectively, each of which is most preferably an integral elastomeric structure having a hollow rectangular cross-sectional configuration.

Figure 7:
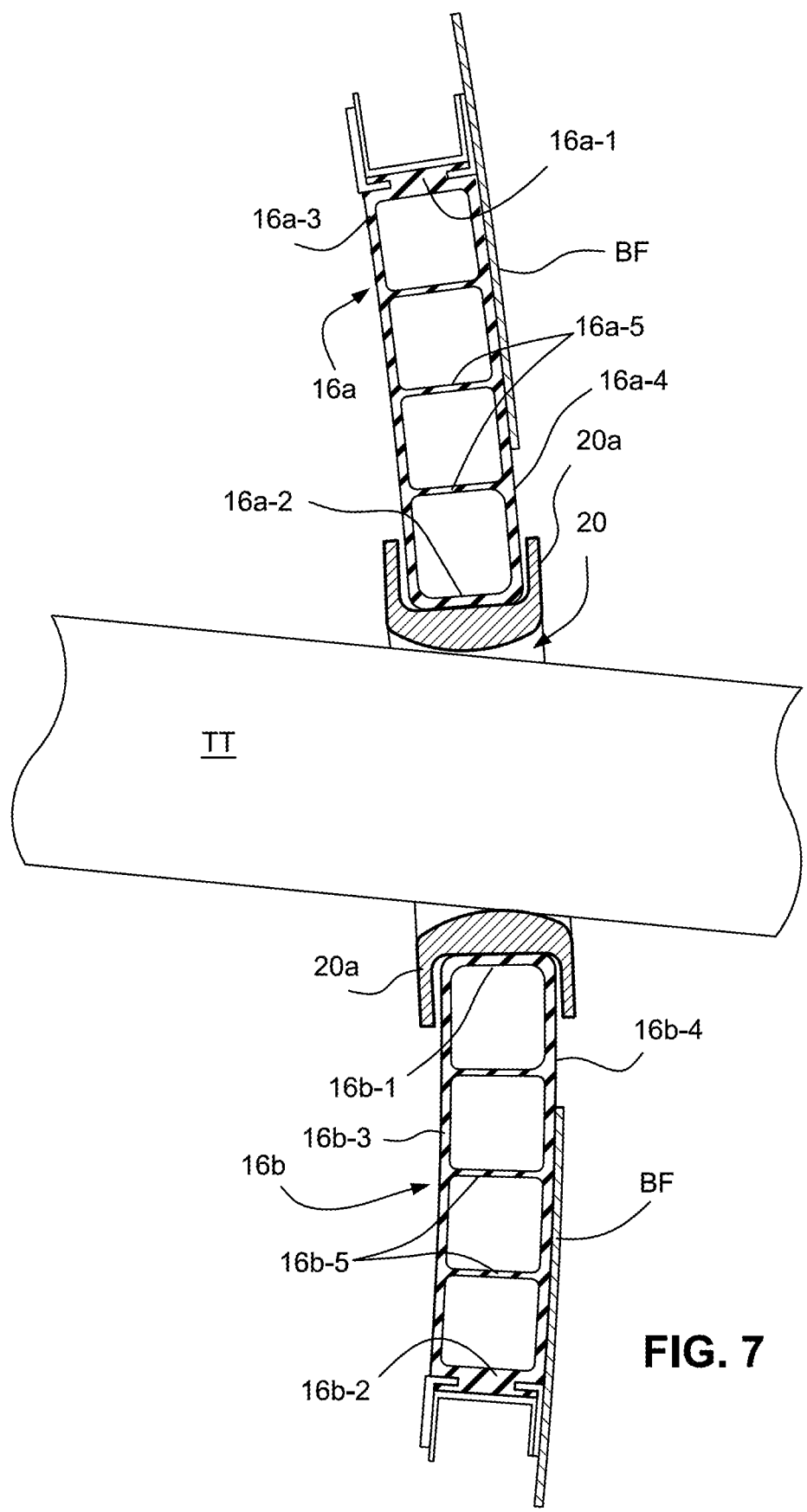
FIG. 7 is an enlarged cross-sectional elevational view of the seal assembly as taken along lines 7-7 in FIG. 6B.

As is perhaps best depicted in FIG. 7, the upper seal member is formed of opposed upper and lower walls 16a-1, 16a-2 integrally joined to opposed interior and exterior walls 16a-3, 16a-4 so as to define an interior space therewithin. A series of internal walls 16a-5 extend integrally between the opposed interior and exterior walls 16a-3, 16a-4 so as to provide controllable compression of the seal when experiencing a compressive force.

Similarly, the lower seal member is formed of opposed upper and lower walls 16b-1, 16b-2 integrally joined to opposed interior and exterior walls 16b-3, 16b-4 so as to define an interior space therewithin. A series of internal walls 16b-5 extend integrally between the opposed interior and exterior walls 16b-3, 16b-4 so as to provide controllable compression of the seal when experiencing a compressive force.

Figure 6A:
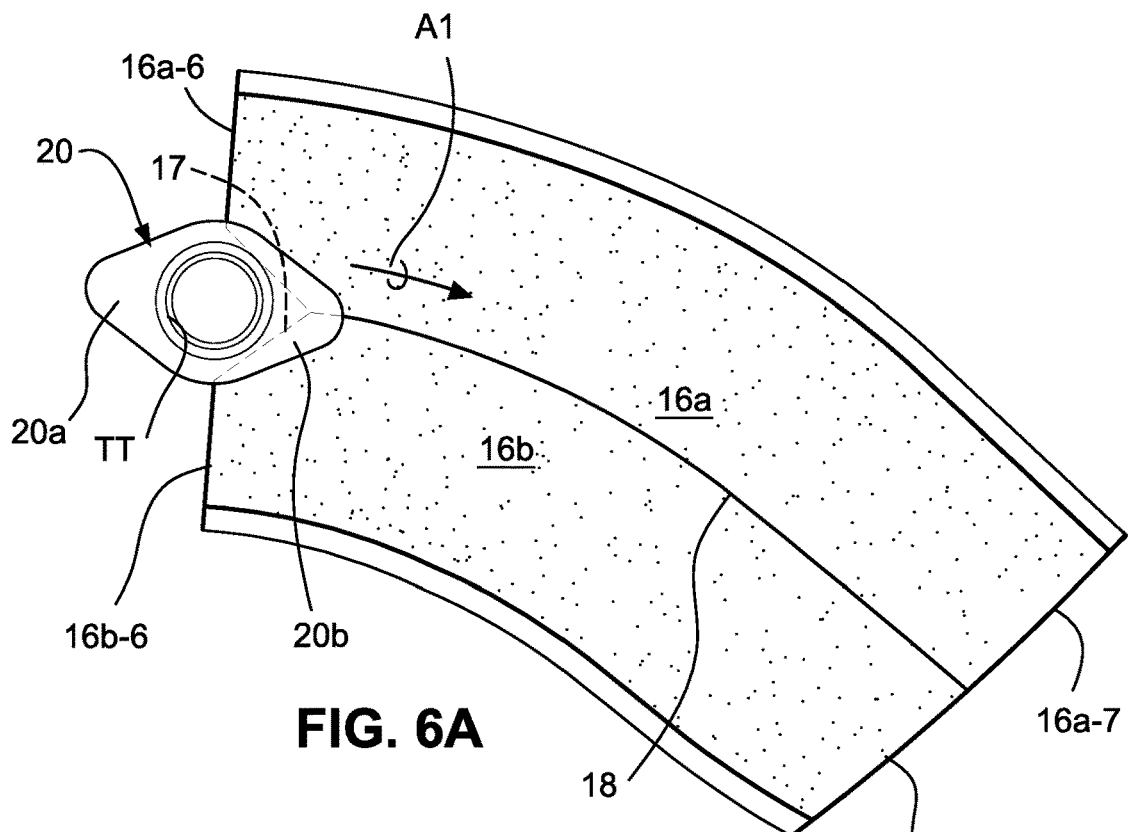
FIGS. 6A and 6B are side elevational views of the variable angular seal assembly depicted with the flap torque tub in retracted and extended positions, respectively.
Figure 6B:
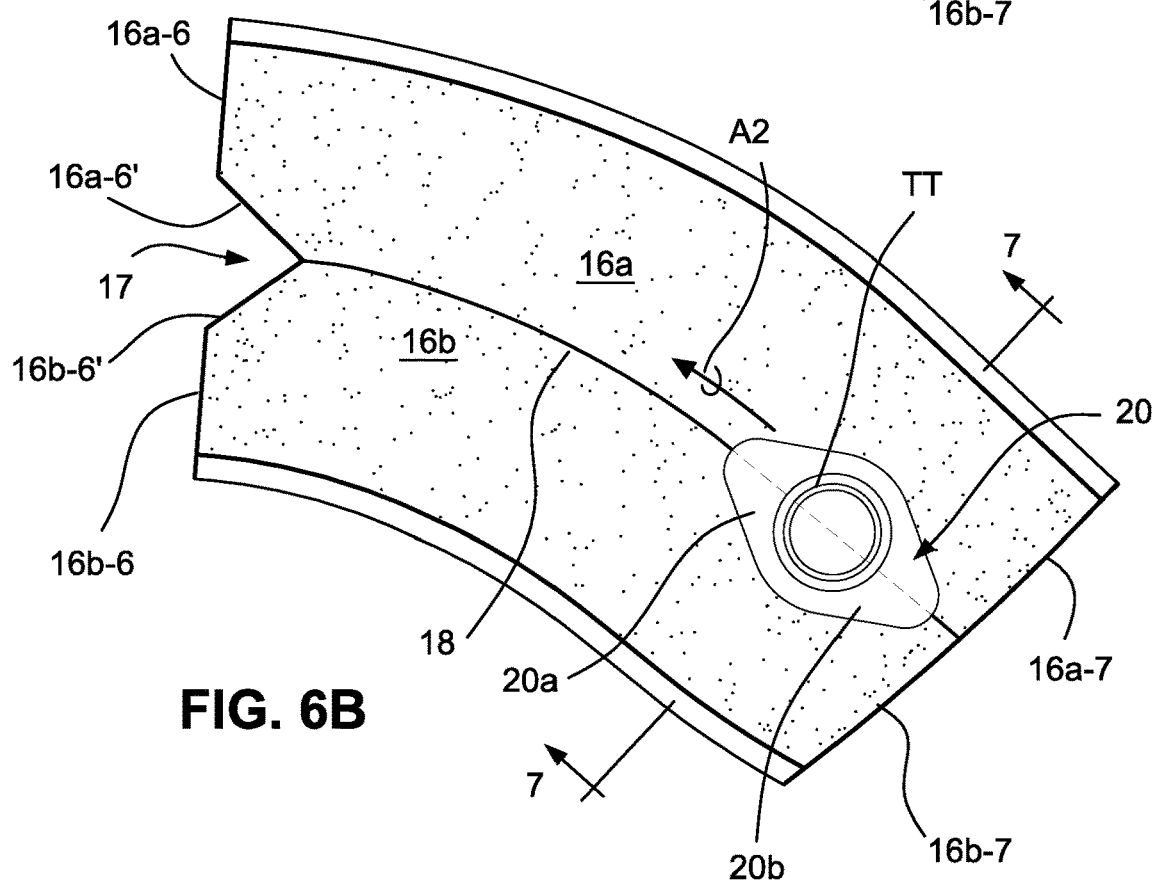

Each of the upper and lower seal members 16a, 16b is closed by forward and rearward end walls 16a-6, 16b-6 and 16a-7, 16b-7, respectively (see FIGS. 6A and 6B). It will be observed that the forward end walls 16a-6, 16b-6 include respective aft-wise opposed inclined wall portions 16a-6', 16b-6' which thereby form a V-shaped recess 17 at a forward end of the seal members 16a, 16b.

The upper wall 16a-1 of the upper seal member 16a and the lower wall 16b-2 of the lower seal member 16b are joined to the aircraft structure (e.g., a portion of the belly fairing BF as shown in FIG. 7) adjacent to respective edge of the cutout opening CO. The lower wall 16a-2 of the upper seal member 16a and the upper wall 16b-1 of the lower seal member 16b are thereby in opposed non-compressive contact with one another along a variably curved interfacial split line 18 between the opposed seal members 16a, 16b.

The torque tube TT carries a guide support structure 20 having opposed forward-facing and aft-facing tapered U-shaped guide surfaces 20a, 20b, respectively, configured to receive therein respective lower and upper portions of the upper and lower seal members 16a, 16b. Specifically, it will be observed that the forward tapered and aft tapered guide surfaces 20a, 20b are adapted to slideably contact the lower and upper walls 16a-2, 16b-1, respectively, during translational movement of the torque tube between its forward and aft positions within the cutout opening CO. The laterally tapered guide surfaces 20a, 20b thus serve as a cam to cause local compression of the upper and lower seal members 16a, 16b as the torque tube TT moves along the variably curved interfacial split line 18 therebetween (i.e., in the direction of arrow A1 in FIG. 6A). The aft tapered guide surface 20b will thereby assist in compressively spreading apart the upper and lower seal members 16a, 16b as the torque tube TT moves in an aft direction from the forward position toward the aft position thereof along the interfacial split 18. Conversely, the forward tapered guide surface 20a will assist in compressively spreading apart the upper and lower seal members 16a, 16b as the torque tube TT moves in a forward direction from the aft position toward the forward position thereof along the interfacial split line 18 (i.e., in the direction of arrow A2 in FIG. 6B). Such local compression of the upper and lower seal members 16a, 16b thereby ensures that the cutout opening CO remains sealably closed during translational movement of the torque tube TT therewithin between its forward and aft positions.

When in its forward position, the aft tapered U-shaped guide surface 20b of the guide support structure 20 carried by the torque tube TT will be positioned within the V-shaped recess 17 formed by the respective aft-wise opposed inclined wall portions 16a-6', 16b-6' at the forward ends of the seal members 16a, 16b. While in such a forward position, therefore, the torque tube TT will thereby not exert any compressive forces against the lower and upper walls 16a-2, 16b-1 of the seal members 16a, 16b. In such a manner, therefore, service life of the split seal 16 will be prolonged since the seal members 16a, 16b will be in a non-compressed state along the split line 18 during a majority of the aircraft operation. Thus, compressive forces will only be exerted against the seal members 16a, 16b by the support structure 20 during translational movement of the torque tube TT along the split line 18 between its forward and aft positions as shown in FIGS. 6A and 6B, respectively, when the wing flaps WF are moved between their retracted and deployed conditions, respectively.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A seal assembly positionable in a cutout opening, the seal assembly comprising:
   a component moveable within the cutout opening between first and second positions relative to opposed fore and aft ends of the cutout opening;
   forward and rearward stationary seals positionable at the opposed fore and aft ends of the cutout opening;
   a split seal extending between the opposed forward and rearward stationary seals, the split seal including opposed upper and lower seal members having forward and rearward ends, the upper and lower seal members having respective lower and upper walls which are in non-compressive contact with one another along a split line between the opposed forward and rearward ends of the seal members so as to allow the component to be moved along the split line between the first and second positions thereof, and
   a guide support structure carried by the component, the guide support structure including opposed forward-facing and aft-facing tapered U-shaped surfaces configured to receive therein the lower and upper walls of the upper and lower seal members, respectively, wherein the upper and lower seal members include aft-wise opposed inclined wall portions at the forward end end thereof defining a V-shaped recess for receiving the aft-facing tapered U-shaped surface of the guide support structure carried by the moveable component when in the first position thereof.

2. The seal assembly according to claim 1, wherein the split line between the lower and upper walls of the opposed upper and lower seal members, respectively, is variably curved.

3. The seal assembly according to claim 1, wherein each of the upper and lower seal members is an integral elastomeric structure having a hollow rectangular cross-sectional configuration.

4. The seal assembly according to claim 3, wherein each of the upper and lower seal members comprises opposed upper and lower walls integrally joined to opposed interior and exterior walls, and opposed end walls.

5. The seal assembly according to claim 4, wherein each of the upper and lower seal members comprises a series of internal walls extending integrally between the opposed interior and exterior walls.

6. An aircraft comprising:
a fairing having cutout opening defining fore and aft ends;
a wing flap which includes a torque tube moveably operable within the cutout opening between forward and aft positions relative to the fore and aft ends of the cutout opening so as to move the wing flap of the aircraft between retracted and deployed positions, respectively; and
a seal assembly sealably closing the cutout opening of the fairing, wherein the seal assembly comprises:
(i) forward and rearward stationary seals positioned at the opposed fore and aft ends of the cutout opening,
(i) a split seal extending between the opposed forward and rearward stationary seals, the split seal including opposed upper and lower seal members having forward and rearward ends, the upper and lower seal members having respective lower and upper walls which are in non-compressive contact with one another along a split line between the opposed forward and rearward ends of the seal members so as to allow the component to be moved along the split line between the first and second positions thereof, and
(iii) a guide support structure carried by the torque tube, the guide support structure including opposed forward-facing and aft-facing tapered U-shaped surfaces configured to receive therein the lower and upper walls of the upper and lower seal members, respectively, wherein
(iv) the upper and lower seal members include aft-wise opposed inclined wall portions at the forward end thereof defining a V-shaped recess for receiving the aft-facing tapered U-shaped surface of the guide support structure carried by the torque tube when in the first position thereof.

7. The aircraft according to claim 6, wherein the split line between the lower and upper walls of the opposed upper and lower seal members, respectively, is variably curved.

8. The aircraft according to claim 6, wherein each of the upper and lower seal members is an integral elastomeric structure having a hollow rectangular cross-sectional configuration.

9. The aircraft according to claim 8, wherein each of the upper and lower seal members comprises opposed upper and lower walls integrally joined to opposed interior and exterior walls, and opposed end walls.

10. The aircraft according to claim 9, wherein each of the upper and lower seal members comprises a series of internal walls extending integrally between the opposed interior and exterior walls.

* * * * *